May 27, 1969     O. BSCHORR     3,446,059
VIBRATION GENERATOR
Filed Feb. 24, 1967
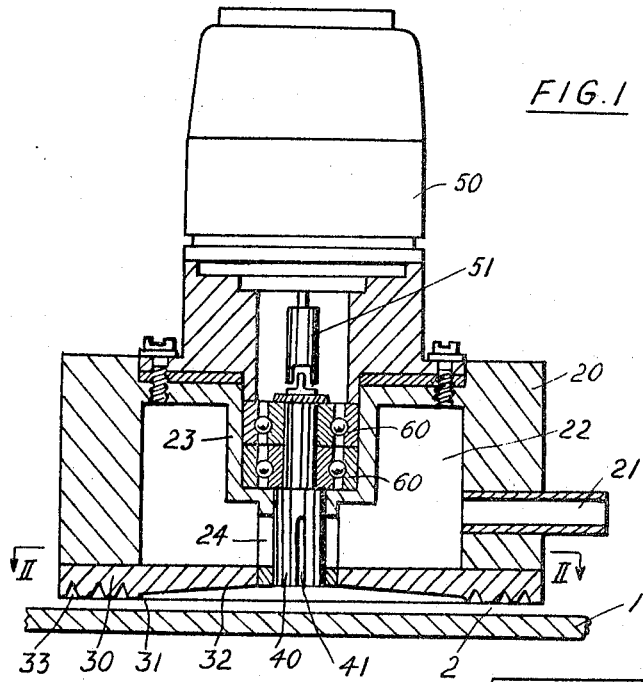
FIG.1
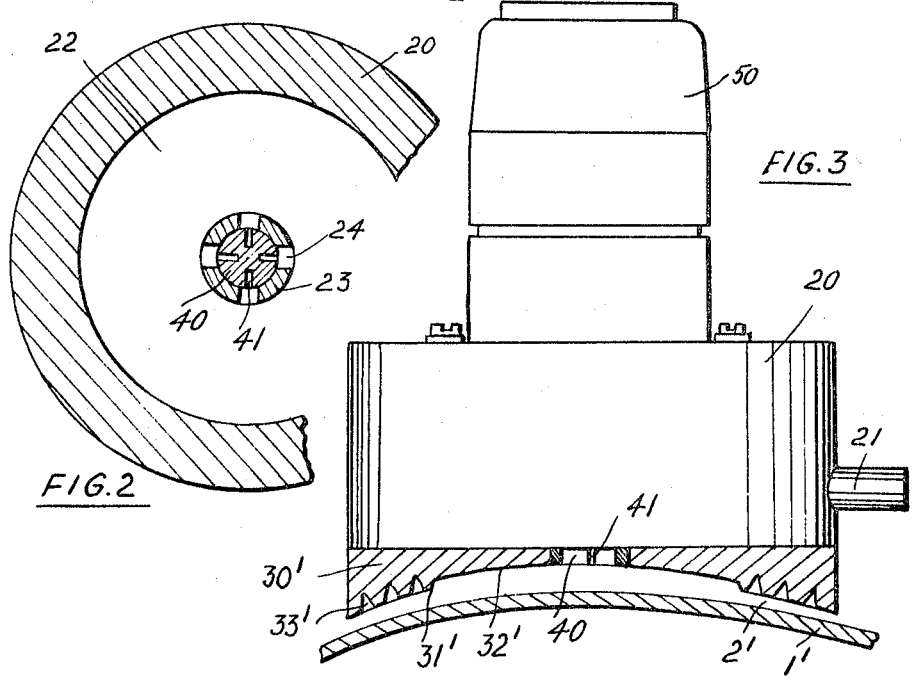
FIG.2
FIG.3
INVENTOR:
Oskar Bschorr
ATTORNEYS.

United States Patent Office 3,446,059
Patented May 27, 1969

3,446,059
VIBRATION GENERATOR
Oskar Bschorr, 2 Kirschackerweg,
Munich, Germany
Filed Feb. 24, 1967, Ser. No. 618,543
Int. Cl. G01n 29/00
U.S. Cl. 73—71.5    9 Claims

ABSTRACT OF THE DISCLOSURE

This invention provides a pneumatic vibration generator for producing alternating forces to test a structural member without establishing physical contact therewith. The generator includes a housing having a cover plate secured to the housing to form an internal pressure chamber. A stator means is located within this chamber and has an air passage portion including a plurality of openings into the said pressure chamber. A rotor is rotatably mounted within the air passage portion of the stator means and has a plurality of ports extending from the air passage portion to an outlet means located in the cover plate. A drive means rotates the rotor within the stator means thereby interrupting the flow of air through the said cover plate outlet means to form a pulsating air cushion between the cover plate and the said structural member. It is thereby possible to create alternating forces of optional frequency and optional intensity that correspond to the breaking frequency and the compressed air supplied to the pressure chamber.

Background of the invention

This invention relates to a vibration generator. Vibration generators are required, for example, for testing the behavior of structural members under vibration, their resistance to vibrations or dynamic strength and the like. The most common vibration generators are those of the electrodynamic type. Furthermore, hydrostatic vibration generators, too, are in use. These two types have the disadvantage that the load transmission to the structural part to be tested has to be effected through a mechanical connection, such as a screw joint, a glued connection or the like. In electrodynamic vibration generators it is particularly disadvantageous that due to the use of permanent magnets their weight is rather large in proportion to their efficiency.

Discussion of prior art

A pulsator has already become known in which a current of compressed air is periodically interrupted by a rotating break member, with the pressure impulses acting on a liquid container separated by a diaphragm. This construction requires however a firm connection between the pulsator and the specimen to be tested. Especially in the case of fatigue tests a contactless load transmission is required according to the case of load. In the case of non-contactless stress introduction, the natural frequency and the form of vibration of the structural member to be tested will be altered by the transmission element.

Other prior art vibration generators, in which the load transmission is effected in a contactless manner, are operating with electrostatic interaction. But these vibration generators can produce only insignificant forces. The principle of producing in structural members under test a remote effect by eddy current induction has, moreover, the disadvantage that a useful component force is obtained only with high-frequency excitation.

Summary of the invention

The object of the invention is to construct a vibration generator in such a manner that it makes possible a contactless load transmission to the structural member to be tested and that the structural weight of the vibration generator is extremely low in proportion to the generated power and that the vibration generator, furthermore, is of extremely small dimensions. Also, the vibration generator proposed by the invention is intended to be capable of generating not only point loads but also surface loads.

This object is attained according to the invention by an air cushion built up between the vibration generator and the structural member. In this arrangement the compressed air for building up the air cushion is supplied to the vibration generator through a special conduit, the air current for the air cushion being constantly interrupted. To achieve this end, an air valve or a rotor-stator arrangement may be provided. Expediently, the vibrator generator is provided with a cover plate having a beaded rim portion provided with as large as possible a number of grooves in the outer endface thereof, thereby to prevent rapid air escape in the manner of an axial labyrinth gland.

If structural members having no plane surface but a convex or irregular surface are to be caused to vibrate, the beaded rim portion of the vibration generator may be adapted so as to correspond to such irregular surface.

Brief description of drawings

Some embodiments of the invention will now be described by way of example and with reference to the accompanying drawing, in which:

FIG. 1 is a sectional view of a vibration generator according to the invention;

FIG. 2 is a section taken on the line II—II of FIG. 1, and

FIG. 3 is a side elevation view, partly in section, of a vibration generator for uneven structural members.

Description of specific embodiment

Referring to FIG. 1, a structural member 1 to be caused to vibrate is disposed at a spacing 2 from the vibration generator, that is there is no positive connection whatsoever between the latter and the structural member 1. The vibration generator substantially comprises a housing 20, a cover plate 30, a rotor 40, and a driving motor 50. Compressed air can be supplied to an annular pressure chamber 22 in the housing 20 through a pressure air conduit 21. The annular pressure chamber 22 is separated from the rotor 40 by a stator 23. The rotor 40 is rotatably mounted by means of ball bearings 60 and provided with ports 41. The stator 23 is provided with ports 24.

During the rotation of the rotor 40 an air passage from the annular pressure chamber 22 to the structural member 1 is alternately opened, when the ports 24 and 41 in the stator 23 and the rotor 40, respectively, are coincident with one another, and closed. The intermittent supply of compressed air produces between the vibration generator and the structural member 1 to be caused to vibrate a pulsating air cushion capable of transmitting considerable alternating forces to the structural member 1.

The cover plate 30 applied to the lower end of the vibration generator is provided with a beaded rim portion 31 provided with a plurality of grooves 33. In this manner a free escape of the air is rendered more difficult so that, with the same air throughput, the spacing 2 between the structural member 1 and the vibration generator may be made relatively large. Moreover, the cover plate 30 has an endface 32 which is concave or otherwise shaped so that the radially outwardly escaping air will gain no high velocities, in order not to reduce the effective static pressure. On the other hand, too large a volume between the vibration generator and the structural part 1 would act like a balancing pad and reduce the pressure differences.

For establishing a driving connection between the rotor 40 and the driving motor 50 a clutch 51 is provided. The cover plate 30 is fixed to the housing 20, for example, by means of screws (not shown) and can be interchanged.

FIG. 2 shows the arrangement of the ports 24 and 41 in the stator 23 and the rotor 40, respectively. In the illustrated relative position the air passage from the annular pressure chamber 22 through the ports 24 and 41 is opened. When the rotor 40 is rotated, the air passage will be closed, opened again, and so on. The impulse frequency depends on the number of ports and on the rotor speed. The chosen width of the ports permits of any desired opening section.

For generating aperiodic forces the ports 24 and 41 may expediently be asymmetrical and of different widths. In this case, furthermore, the rotor 40 will be driven not at constant but at rapidly changing speed. These means enable any specrum of forces to be simulated according to the known theory of frequency modulation.

FIG. 3 shows an embodiment of vibration generator for use with uneven structural parts 1'. In this case the cover plate 30 of the FIG. 1 embodiment is substituted by a concave cover plate 30' adapted to the surface of the structural part 1' and disposed at a spacing 2' therefrom. The cover plate 30', too, has a beaded rim portion 31' with grooves 33' and is provided with an endface 32' shaped to achieve suitable flow conditions. In the case of complicated structural members 1' it is possible to provide the cover plate 30' in the form of a copy casting.

The invention may be embodied in other specific forms without departing from the spirit or essential characteristics thereof.

I claim:

1. A pneumatic vibration generator for producing alternating forces to test a structural member without establishing physical contact with said member comprising, in combination,
   (a) a housing, a cover plate secured to the housing to form an internal pressure chamber, said cover plate having an endface for facing said structural member,
   (b) a stator means located within said chamber and having an air passage portion including a plurality of openings into said pressure chamber,
   (c) means rotatably mounting a rotor within said air passage portion, said rotor having a plurality of ports extending from the air passage portion to an outlet means located in said cover plate,
   (d) means supplying compressed air to said pressure chamber, and
   (e) drive means to rotate said rotor for interrupting the flow of air through said cover plate outlet means to form a pulsing air cushion between said cover plate and said structural member.

2. A generator as defined in claim 1 wherein said drive means includes means to vary the speed of said rotor.

3. A generator as defined in claim 1 wherein said end face includes a beaded rim portion to assist the building up of said air cushion.

4. A generator as defined in claim 3 wherein said beaded rim portion includes a plurality of longitudinal grooves.

5. A generator as defined in claim 1 wherein said end face includes a lower surface portion having a generally concave configuration.

6. A generator as defined in claim 1 wherein said end face includes a lower surface portion having a shape corresponding to the form of the structural member to be tested to provide an approximately constant cross section in the direction of the air current.

7. A generator as defined in claim 1 wherein said cover plate is detachable.

8. A generator as defined in claim 1 wherein said drive means includes means to rapidly vary the speed of the rotor for generating aperiodical vibration forces.

9. A generator as defined in claim 10 wherein said ports in said rotor and said openings in said stator means are unevenly and asymmetrically distributed over the circumference of a common surface of contact between said rotor and said stator means.

References Cited

UNITED STATES PATENTS

| | | | |
|---|---|---|---|
| 2,682,167 | 6/1954 | Gamarekian | 73—67.3 |
| 2,199,821 | 5/1940 | Hapgood | 137—624.13 X |
| 2,738,671 | 3/1956 | Fiske et al. | 73—71.5 |
| 3,124,099 | 3/1964 | Skilling | 73—71.5 X |
| 3,206,926 | 9/1965 | Lockwood | 137—624.13 X |
| 2,551,289 | 5/1951 | Quinlain | 73—71.5 |

FOREIGN PATENTS

| | | |
|---|---|---|
| 21,522 | 6/1911 | Norway. |
| 575,917 | 3/1946 | Great Britain. |

RICHARD C. QUEISSER, *Primary Examiner.*

JOHN P. BEAUCHAMP, *Assistant Examiner.*